US011418447B1

(12) United States Patent
Emerson et al.

(10) Patent No.: US 11,418,447 B1
(45) Date of Patent: Aug. 16, 2022

(54) LEVERAGING OUT-OF-BAND COMMUNICATION CHANNELS BETWEEN PROCESS AUTOMATION NODES

(71) Applicant: Yokogawa Electric Corporation, Tokyo (JP)

(72) Inventors: David Emerson, Coppell, TX (US); Joseph Malm, Plano, TX (US); Andrew Keller, Lewisville, TX (US); Patrick Clay, Frisco, TX (US); Hidenori Sawahara, Spring, TX (US); Vien Nguyen, Frisco, TX (US)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/244,350

(22) Filed: Apr. 29, 2021

(51) Int. Cl.
*G05B 19/418* (2006.01)
*H04L 47/122* (2022.01)
*H04L 43/0876* (2022.01)

(52) U.S. Cl.
CPC ........ *H04L 47/122* (2013.01); *H04L 43/0876* (2013.01); *G05B 19/4185* (2013.01); *G05B 2219/32406* (2013.01)

(58) Field of Classification Search
CPC .............. H04L 47/122; H04L 43/0876; G05B 19/4185; G05B 2219/32406
See application file for complete search history.

(56) References Cited

U.S. PATENT DOCUMENTS

| | | | |
|---|---|---|---|
| 9,876,612 B1* | 1/2018 | Maveli | H04L 47/34 |
| 2009/0150977 A1* | 6/2009 | Carley | H04L 41/28 |
| | | | 726/3 |
| 2009/0208206 A1* | 8/2009 | Madrahalli | H04L 45/026 |
| | | | 398/58 |
| 2012/0082092 A1* | 4/2012 | Choi | H04W 88/06 |
| | | | 370/328 |
| 2016/0065656 A1* | 3/2016 | Patin | H04L 67/10 |
| | | | 709/201 |
| 2018/0013660 A1* | 1/2018 | Kutergin | H04L 61/1552 |
| 2019/0149474 A1* | 5/2019 | Iyer | H04L 43/0823 |
| | | | 370/230.1 |
| 2022/0007195 A1* | 1/2022 | Shaw | H04W 28/0268 |

* cited by examiner

*Primary Examiner* — Jonathan A Bui
*Assistant Examiner* — Kidest Mendaye
(74) *Attorney, Agent, or Firm* — Middleton Reutlinger

(57) ABSTRACT

Implementations are described herein for leveraging an "out-of-band" communication channel between nodes of a process automation system. In various implementations, an out-of-band communication channel may be established between two or more process automation nodes of a process automation system. The out-of-band communication channel may be outside of a process automation network through which the two or more process automation nodes are communicatively coupled with other process automation nodes of the process automation system. The two or more process automation nodes may cooperate with one or more of the other process automation nodes to implement an at least partially automated process. One or more characteristics of the process automation system may be monitored, and based on the monitoring, traffic may be selectively diverted from the process automation network to the out-of-band communication channel.

20 Claims, 8 Drawing Sheets

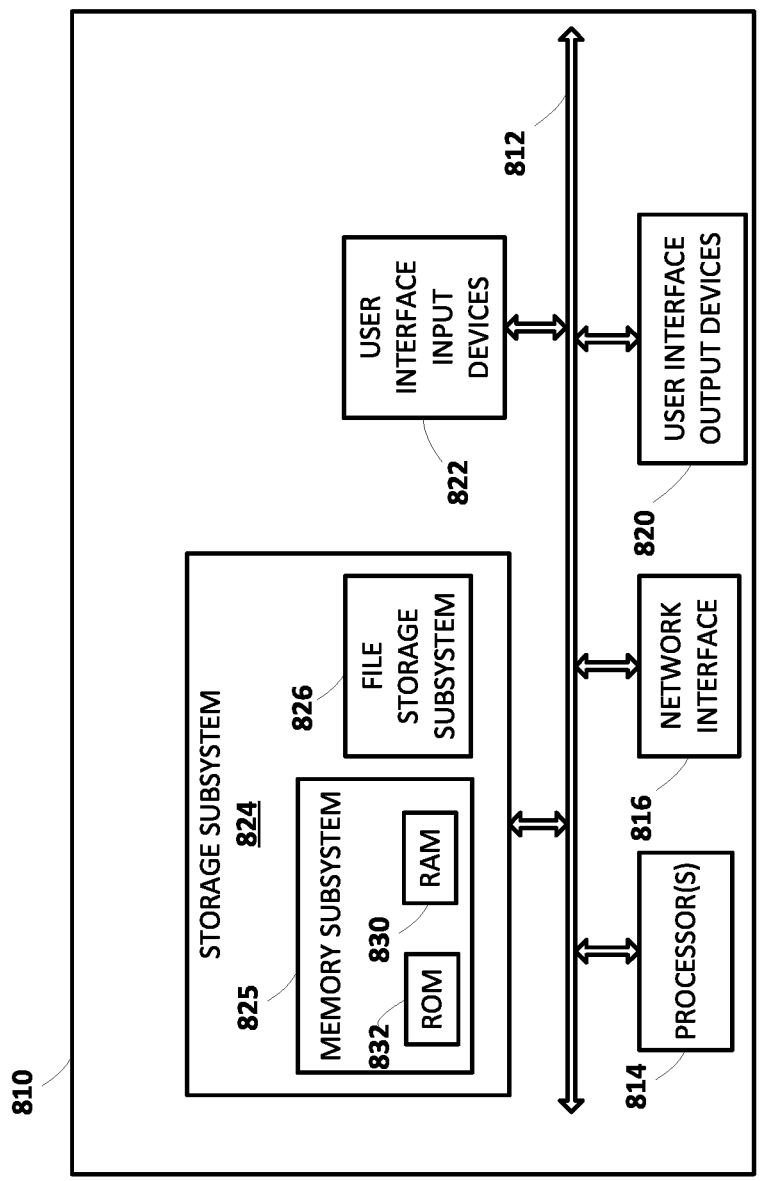

_US 11,418,447 B1_

LEVERAGING OUT-OF-BAND COMMUNICATION CHANNELS BETWEEN PROCESS AUTOMATION NODES

BACKGROUND

A process automation system may include one or more process automation networks. A process automation network may be the primary communication channel(s) over which devices such as distributed control nodes (DCNs) communicate with other nodes of the process automation system such as other DCNs, sensors, actuators, etc. Process automation networks are typically implemented using communication technologies that are reliable, fast, and that have considerable bandwidth, such as Ethernet.

SUMMARY

Administering a process automation system may present a variety of technical challenges. As one example, a process automation node such as a DCN may malfunction and/or otherwise go offline, in which case it is unable to perform its role (often defined by one or more function blocks) in the process automation system. As another example, the process automation network itself may become overloaded and/or congested, and/or portions of the process automation network may fail. As yet another example, data generated by a particular process automation node may be deemed more sensitive than data generated by other process automation nodes, and there may be desire or need to ensure such sensitive traffic cannot be easily intercepted, e.g., by malicious or otherwise unauthorized parties. As yet one more example, data generated or collected by a particular process automation node may be deemed higher priority than data generated or collected by other process automation nodes. There may be desire or need to ensure such high priority traffic arrives at its destination accurately and/or in a timely manner.

In addition, a process automation network often has many process automation nodes communicatively coupled to it. The process automation network may also include other networking nodes, such as firewalls to other systems. These myriad nodes provide potential targets for malware and attackers. If the process automation network is breached or infiltrated, a recently-added device such as a DCN may be especially vulnerable because it may not yet include security mechanisms that could protect it. Likewise, if the recently-added device is compromised and then put into service, it may pose a security threat to the entire process automation network.

Accordingly, implementations are described herein for leveraging an "out-of-band" communication channel between two or more nodes of a process automation system to mitigate against these issues in various ways. More particularly, but not exclusively, techniques are described herein for establishing, between one or more DCNs, an out-of-band communication channel that is outside of a primary process automation network of the process automation system. In some implementations, the out-of-band communication channel may be implemented using a wired or wireless communication technology such as Wi-Fi direct, universal serial bus (USB), near-field communication (NFC), Bluetooth, etc. In some implementations, the out-of-band communication channel may communicatively couple more than two process automation nodes, and therefore may alternatively be referred to as an out-of-band network. Such an out-of-band communication channel may be used for a variety of different purposes, such as provisioning a new device for operating as part of the process automation system, security, load distribution, redundancy, and/or network traffic management.

With respect to provisioning and security, the out-of-band communication channel may serve as a de facto firewall that may shield a to-be-added device from any malicious content (e.g., malware, computer viruses) on the process automation network. In addition, wherein the out-of-band communication channel is established between a to-be-added device and an existing member node of the process automation network (e.g., DCN), the out-of-band communication channel may be used securely authenticate the to-be-added device while shielding the process automation network from any malicious content that might be on the to-be-added device. For example, by using the secure and/or private out-of-band communication channel, the existing member node can obtain the files, programs, and/or data that is to be loaded to the to-be-added device, and may act as a pass-through to the added device. Consequently, the added device is better prepared to be a secure member of the process automation system that functions as intended. In some implementations, the existing member node may obtain these data from other member(s) of the process automation network. In other implementations, the existing member node may obtain these data from a process automation management system (e.g., a central server).

With respect to load distribution and/or redundancy, the out-of-band communication channel may be maintained between two or more process automation nodes so that it can continue to be used as a private channel for the two or process automation nodes to exchange data in real time. This may allow either process automation node to take over and/or supplement one or more functions (e.g., function blocks) of the other process automation node if the other process automation node is unable to perform them, e.g., due to power down, malware, human intervention, losing network connectivity, etc. The decision as to which functions a process automation node should perform when the other process automation node is unable may be manually set by a person, selected and/or voted upon in real time by other process automation nodes of the process automation network, and/or determined using various artificial intelligence and/or machine learning techniques.

With respect to network traffic management, in some implementations, traffic may be diverted from the process automation network to the out-of-band communication channel in real time. Traffic may be shifted in this manner based on a variety of different factors, including but not limited to: (i) congestion and/or disruption that are detected and/or predicted to occur in the process automation network; (ii) a desire to ensure that particular traffic remains private between the nodes coupled to the out-of-band communication channel; and (iii) relative priorities of various traffic, to name a few.

In some implementations, if a network overload occurs on the process automation network, all or at least some devices on the process automation network may throttle their traffic to maintain flow and avoid bottlenecks. For example, each application operating on a device such as a DCN that publishes data on the process automation network may ascertain the network load at the time of publishing; the application may reduce or increase its frequency based on that network load, and/or may shift traffic to out-of-band communication channel(s) available to it.

In some implementations, the out-of-band communication channel may be implemented with multiple channels and/or sub-networks, e.g., one for asset management data (e.g., health data), another for process automation control, another for time-sensitive networking data exchange, etc.

In some implementations, a method may be implemented using one or more processors and may include: establishing an out-of-band communication channel between two or more process automation nodes of a process automation system, wherein the out-of-band communication channel is outside of a process automation network through which the two or more process automation nodes are communicatively coupled with other process automation nodes of the process automation system, and wherein the two or more process automation nodes cooperate with one or more of the other process automation nodes to implement an at least partially automated process; monitoring one or more characteristics of the process automation system; and based on the monitoring, selectively diverting traffic from the process automation network to the out-of-band communication channel.

In various implementations, the one or more monitored characteristics of the process automation system include network traffic on the process automation network. In various implementations, the one or more monitored characteristics of the process automation system may include network congestion detected based on the network traffic on the process automation network.

In various implementations, the one or more monitored characteristics of the process automation system may include a measure of privacy assigned to at least some of the network traffic. In various implementations, the selectively diverting may include diverting network traffic assigned a first measure of privacy from the process automation network to the out-of-band communication channel.

In various implementations, the one or more monitored characteristics of the process automation system may include relative priorities assigned to at least some of the network traffic. In various implementations, the selectively diverting may include diverting network traffic assigned a first relative priority from the process automation network to the out-of-band communication channel.

In various implementations, the one or more monitored characteristics of the process automation system may include an ability of a given process automation node of the process automation system to execute a function block.

In various implementations, the monitoring may be performed by a DCN before the DCN publishes data to other process automation nodes of the process automation network.

In various implementations, the method may further include transmitting configuration data from a first process automation node of the two or more process automation nodes to a second process automation node of the two or more process automation nodes over the out-of-band communication channel. The configuration data may include: information technology (IT) configuration data that is usable by the second process automation node to join the process automation network, and operational technology (OT) configuration data that is usable by the second process automation node to cooperate with the one or more of the other process automation nodes of the process automation system to implement the at least partially automated process.

In various implementations, the two or more process automation nodes may include at least three process automation nodes, and the out-of-band communication channel may be a network that communicatively couples the at last three process automation nodes and that is implemented using a different communication technology than the process automation network.

In various implementations, the method may further include exchanging device health information between the two or more nodes via the out-of-band communication channel. In various implementations, exchanging time-sensitive networking metadata between the two or more nodes via the out-of-band communication channel.

In another aspect, a DCN may include: first and second communication interfaces; and circuitry configured to: join a process automation network using the first communication interface, wherein the process automation network communicatively couples a plurality of process automation nodes of a process automation system; join an out-of-band communication channel between the DCN and one or more other process automation nodes of the process automation system using the second communication interface; detect occurrence of an event; and based on the detection of the occurrence of the event, divert at least some traffic from the DCN to the out-of-band communication channel.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 8 schematically illustrates an example computer architecture on which selected aspects of the present disclosure may be implemented.

DETAILED DESCRIPTION

As used herein, an "at least partially automated process" includes any process cooperatively implemented within a process automation system by multiple devices with little or no human intervention. One common example of an at least partially automated process is a process loop in which one or more actuators are operated automatically (without human intervention) based on output of one or more sensors. Some at least partially automated processes may be sub-processes of an overall process automation system workflow, such as a single process loop mentioned previously. Other at least partially automated processes may comprise all or a significant portion of an entire process automation system workflow. In some cases, the degree to which a process is automated may exist along a gradient, range, or scale of automation. Processes that are partially automated, but still require human intervention, may be at or near one end of the scale. Processes requiring less human intervention may approach the other end of the scale, which represents fully autonomous processes. Process automation in general may be used to automate processes in a variety of domains, e.g., manufacture, development, and/or refinement of chemicals (e.g., chemical processing), catalysts, machinery, etc.

As used herein, information technology (IT) configuration data may enable a device such as a distributed control node (DCN) to engage in network communication with other nodes on a process automation network. IT configuration data may include networking parameters that can be used to join and/or communicate over the process automation network. These parameters may include, for instance an internet protocol (IP) address, an IP subnet mask, routing tables, etc. IT configuration data may also include data associated with hardware or software of the device, such as firmware or operating system (OS) updates, redundancy policies, security policies, etc.

By contrast, operational technology (OT) configuration data may enable a device such as a DCN to cooperate with (e.g., exchange commands and/or sensor data with) one or more actuators or sensors on the process automation network to implement an at least partially automated process. OT configuration data for a DCN may include, among other things: process automation applications to be installed on and/or operated by a DCN; a range limit to be imposed on/by the DCN; a preferred unit of measurement to be used by the DCN; an update frequency to be implemented by the DCN; one or more analog-to-digital conversion parameters to be used by the DCN; information about (e.g., roles of) other nodes in the process automation system; one or more signal conditioning parameters to be used by the DCN; security credentials for operation in the process automation system; error correction parameters (e.g., error correction code techniques) to be used by the DCN; etc.

Figure 1:
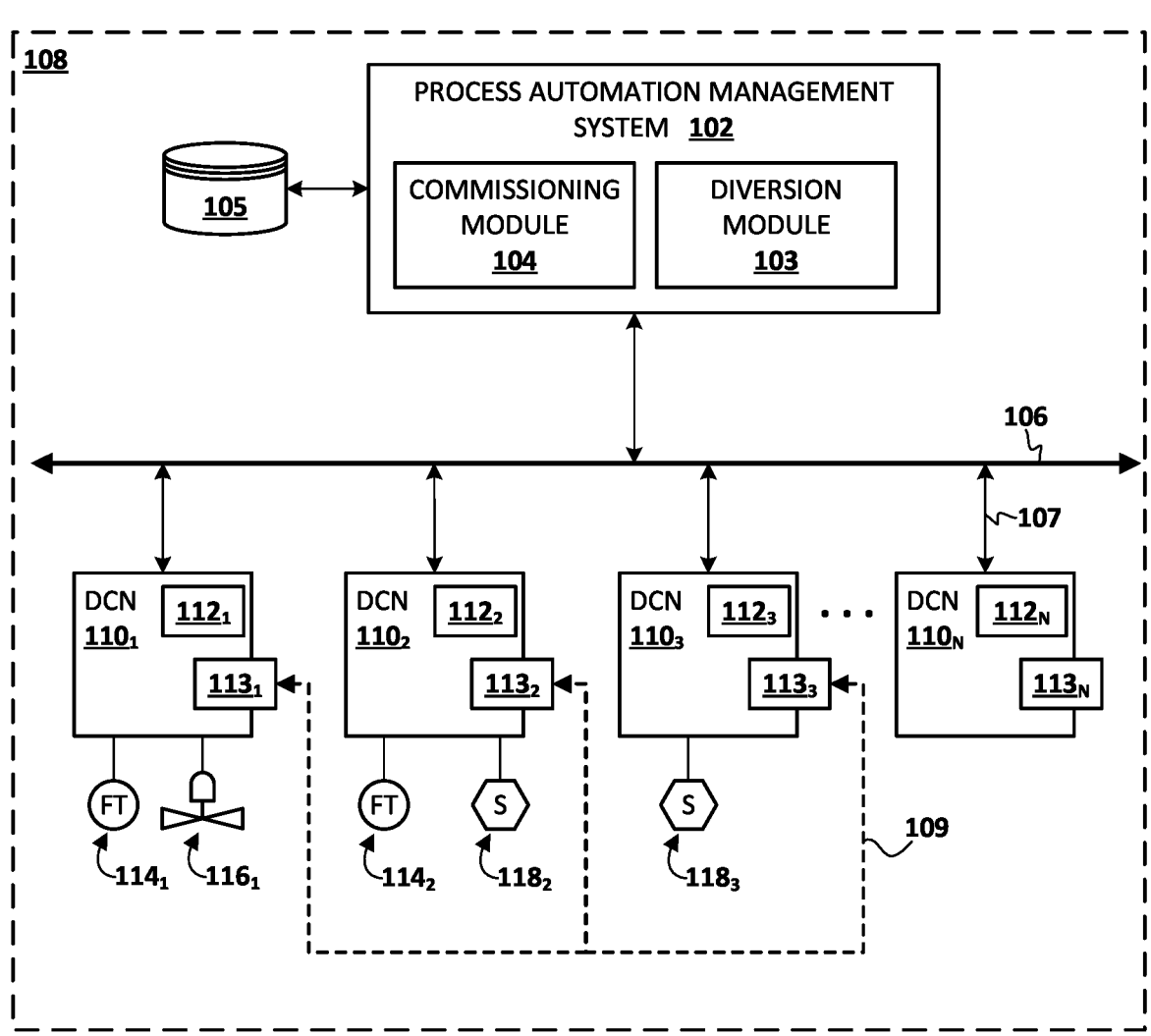
FIG. 1, FIG. 2, FIG. 3, FIG. 4, and FIG. 5 schematically depict various scenarios in which selected aspects of the present disclosure may be implemented, in accordance with various embodiments.

Referring now to FIG. 1, an example environment 100 in which various aspects of the present disclosure may be implemented is depicted schematically. A process automation management system 102 is operably coupled with a process automation network 106 in a process automation facility 108. Process automation facility 108 (alternatively referred to herein as "process automation system 108") may take numerous forms and may be designed to implement any number of at least partially automated processes. For example, process automation facility 108 may form all or part of a chemical processing plant, an oil or natural gas refinery, a catalyst factory, a manufacturing facility, etc.

Process automation network 106 may be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 may be configured with redundancies and/or backups to provide high availability (HA) and/or high quality of service (QoS). Additionally, nodes that exchange data over process automation network 106 may implement time-sensitive networking (TSN) to facilitate time synchronization and/or real-time control streams.

Process automation management system 102 may include a diversion module 103, a commissioning module 104, and a database 105 that stores information used by commissioning module 104 to commission new devices to process automation facility 108. Various aspects of process automation management system 102, such as diversion module 103 and/or commissioning module 104, may be implemented using any combination of hardware and software. In some implementations, process automation management system 102 may be implemented across multiple computer systems as part of what is often referred to as a "cloud infrastructure" or simply the "cloud." However, this is not required, and in FIG. 1, for instance, process automation management system 102 is implemented within process automation facility 108, e.g., in a single building or across a single campus of buildings or other industrial infrastructure. In such an implementation, process automation management system 102 may be implemented on one or more local computing systems, such as on one or more server computers.

In addition to process automation management system 102, a variety of other nodes/devices are operably coupled with process automation network 106. In FIG. 1, for instance, N (positive integer) DCNs $110_{1-N}$ are operably coupled with process automation network 106. Each DCN may include circuitry or logic 112 that may take various forms, such as processor(s) that execute instructions in memory, a field-programmable gate array (FPGA), an application-specific integrated circuit (ASIC), and so forth. Each DCN 110 may have one or more roles to play in process automation facility 108. "Compute" DCNs, for instance, may control a process loop (e.g., a chemical process loop) in which various "field" devices (e.g., devices having sensors and/or actuators) interface with each other to perform some number of function control blocks (FBs).

Each DCN 110 may have various input/output (I/O) and other hardware components that dictate at least some of its OT capabilities and, more generally, its role at process automation facility 108. OT capabilities may vary widely among industries. In some cases, OT capabilities may include, but are not limited to, a count of I/O channels; type(s) of I/O channel(s) available; a nominal range limit; nominal unit(s) of measurement; a nominal update frequency; one or more analog-to-digital conversion parameters; one or more signal conditioning parameters; supported open standard protocols such as the Open Platform Communications (OPC) Unified Architecture (OPC UA) and/or Modbus; or any combination thereof.

In FIG. 1, first DCN $110_1$ includes a flow transmitter (FT) component $114_1$ and an actuator (e.g., a valve) $116_1$. Second DCN $110_2$ includes a FT component $114_2$ and a sensor $118_2$, but no actuator. Third DCN $110_3$ includes a sensor $118_3$ but no actuator.

Actuators 116 may be any electric, hydraulic, mechanical, and/or pneumatic component that is controllable to affect some aspect of a process automation workflow that occurs at process automation facility 108. In many cases, an actuator 116 may perform its function in response to various signals, such as sensor signals or commands from compute DCNs (which themselves may monitor for sensor signals). Some non-limiting examples of actuators 116 include, but are not limited to, valves, pistons, rotors, switches, heaters, coolers, stirrers, injectors, devices to create vacuums, belts, tracks, gears, grippers, motors, relays, servomechanisms, etc. A sensor 118 may take various forms, including but not limited to a pressure sensor, a temperature sensor, a flow sensor (e.g., FT component 114), various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and so forth.

Unlike DCNs $110_{1-3}$, $DCN_N$ does not include any input/output (actuators or sensors). Instead, $DCN_N$ may be a "compute only" DCN whose role is to facilitate cooperation between itself and one or more other DCNs 110 on process automation network 106 to implement an at least partially automated process. For example, DCN $110_N$ may control a single process loop (e.g., a chemical process control loop) that involves one or more other DCNs 110. In some cases, such a compute DCN 110 may perform a role similar to an autopilot on an airplane—the compute DCN 110 may receive various signals and, based on those signals and various criteria and/or thresholds, control various actuators. For example, the compute DCN 110 may monitor various sensors 118 and/or FT components 114 to ascertain data about chemical levels, flow rates (e.g., across valves), tank temperatures, control rates, etc., and may control one or more actuators 116 based on these data and/or comparisons of these data to various criteria and/or thresholds. For instance, compute DCN $110_N$ can control actuator $116_1$ by transmitting, to first DCN $110_1$, corresponding command(s) that can optionally conform to a protocol that is specific to and/or implemented by first DCN $110_1$.

As noted previously, administering process automation system 108 may present a variety of technical challenges. Nodes such as DCNs $110_{1-N}$ may malfunction and/or otherwise go offline. Process automation network 106 itself may become overloaded and/or congested, and/or portions of process automation network 106 may fail. Data generated by a particular process automation node (e.g., any of DCNs $110_{1-N}$) may be deemed more sensitive and/or higher priority than data generated by other process automation nodes. And the often large number of nodes provide myriad potential targets for malware and attackers.

Accordingly, implementations are described herein for leveraging an "out-of-band" communication channel 109 between two or more nodes (e.g., two or more DCNs $110_{1-N}$) of process automation system 108 to mitigate against these challenges. For example, in various implementations, out-of-band communication channel 109 may be established between compatible wired or wireless communication interfaces 113 of two or more DCNs, such as between DCNs $110_{1-3}$ in FIG. 1. Out-of-band communication channel 109 may be outside of (e.g., separate from, implemented using a different communication technology, etc.) from process automation network 106 of process automation system 108. While a single out-of-band communication channel 109 is depicted in the Figures, this is not meant to be limiting. Any number of out-of-band communication channels may be established between any number of process automation nodes.

In scenarios in which process automation network 106 is implemented using Ethernet, a connection 107 between a DCN 110 and process automation network 106 may be a registered jack (RJ) 45 connection in some implementations. In many such cases, out-of-band communication channel 109 may be implemented using different communication technologies such as USB, NFC, Bluetooth, etc. However, in other implementations, out-of-band communication channel 109 may be implemented using the same type of communication technology (e.g., Ethernet) as process automation network 106, albeit as a separate network/subnet that is sandboxed from process automation network 106.

In various implementations, out-of-band communication channel 109 may communicatively couple communication interfaces 113 of more than two process automation nodes, as is the case in FIG. 1, and therefore may alternatively be referred to as an "out-of-band network." Out-of-band communication channel 109 may be used for a variety of different purposes, such as provisioning a new device for operating as part of the process automation system, security, load distribution, redundancy, and/or network traffic management.

In some implementations, diversion module 103 may be configured to control and/or influence how out-of-band communication channel 109 is leveraged to address one or more of the various challenges mentioned previously. For example, in some implementations, diversion module 103 may be configured to cause one or more process automation nodes, such as one or more of DCNs $110_{1-N}$, to establish and/or divert traffic to out-of-band communication channel 109 between them. Additionally, diversion module 103 may monitor various characteristic(s) of process automation facility 108, and may selectively divert, or may cause other process automation nodes to selectively divert, traffic from process automation network 106 to out-of-band communication channel 109 based on the monitored characteristic(s).

In various implementations, all or parts of the functionality attributed to diversion module 103 herein may additionally or alternatively be performed at any process automation node, such as at any of DCNs $110_{1-N}$. For example, individual DCNs 110 may monitor the one or more characteristics of process automation system 108 immediately prior to publishing data to process automation network 106, e.g., so that they can selectively divert some or all traffic to out-of-band communication channel 109.

In various implementations, diversion module 103 and/or other components may selectively divert network traffic to out-of-band communication channel 109 based on detected or predicted network congestion and/or disruption. For example, when diversion module 103 detects or predicts a threshold level of network congestion and/or disruption, this may trigger diversion module 103 to reactively or preemptively issue command(s) to one or more of DCNs $110_{1-3}$ to divert some or all of their published network traffic to out-of-band communication channel 109. Network congestion and/or disruption, whether detected/predicted by diversion module 103 or by other process automation nodes (e.g., any of DCNs $110_{1-3}$), may be detected or predicted in various ways, such as a percentage of total bandwidth used, a number or percentage of dropped packets, a detected latency meeting or exceeding some temporal threshold, detection of time-sensitive networking errors, etc.

In some implementations, network congestion may be forecasted in the future based on detection of other conditions that have historically occurred prior to network congestion. These conditions may include, for instance, time of day (e.g., peak hours of operation), certain sensor condition(s) being met, certain process being implemented, etc. These predictions may be rule-based or machine learning-based. For example, inputs that are processed using such a machine learning model may include discretized conditions. Output generated based on such a model may include, for instance, an indication of network congestion probability. Such a machine learning model may take various forms, such as a support vector machine, a random forest, a neural network, etc. In some implementations, a time series machine learning model such as a recurrent neural network (RNN), long short-term memory (LSTM) network, a gated recurrent unit (GRU) network, etc., may be trained on historical data, including data that lead to instances of network congestion. Once trained, the time series model may be iteratively applied to time series data sampled from process automation system 108, such as a temporal sequence of data snapshots of various sensor values. At each iteration, the output may include some indication of network congestion probability.

As one example, if there is no network congestion, then diversion module 103 may not divert any traffic to out-of-band communication channel 109. However, if there is network congestion, then diversion module 103 may issue a command to one or more of DCNs $110_{1-3}$ to divert at least some of their traffic—particularly traffic that is destined for another of DCNs $110_{1-3}$—to out-of-band communication channel 109. In some implementations, diversion module 103 or another component may identify a specific location (e.g., in terms of network topology and/or physical location) of a network traffic bottleneck on process automation network 106. Based on that location, diversion module 103 may instruct DCNs 110 that are closest to that bottleneck and, and that have an out-of-band communication channel 109 available to them, to divert traffic from process automation network 106, thereby alleviating the bottleneck.

In addition to or instead of network congestion, in some implementations, diversion module 103 may take into account desired level(s) of privacy and/or relative priorities of data exchanged over process automation network 106 when causing traffic to be selectively diverted to out-of-band communication channel 109. For example, diversion module 103 may selectively cause highly-sensitive, proprietary, and/or high/low priority network traffic to be diverted through out-of-band communication channel 109, sometimes in response to network congestion, sometimes regardless of network congestion. In some implementations, network packets that form the network traffic may be assigned priorities and/or measures of privacy, e.g., by diversion module 103 and/or the DCNs 110 that generated them. Explicit designations of these priority and/or privacy assignments may be included, for instance, in packet headers and/or payloads of the packets.

Alternatively, in some implementations, priorities and/or measures of privacy may be assigned or inferred contextually, e.g., based on a state of all or portion(s) of process automation system 108, and/or on the state on individual sensor signals. As one example, a packet carrying a measured sensor reading that exceeds or falls below a critical threshold may automatically be tagged, e.g., by diversion module 103 or by the DCN that generated it, as high priority and diverted to out-of-band communication channel 109 accordingly. As another example, assume that a particular sub-process implemented in process automation system 108 includes proprietary and/or secret aspects. While the sub-process is active, network traffic generated by DCN(s) involved in the sub-process may be designated as proprietary and/or secret, and consequently may be diverted to one or more available out-of-band communication channels to avoid it being intercepted from process automation network 106. When the sub-process is inactive, by contrast, traffic generated by those same DCN(s) may be transmitted over process automation network 106 instead.

In some implementations, priorities and/or measures of privacy may be determined based on one or more policies or rules that are enforced by diversion module 103 and/or by one or more individual DCNs 110. As an example, second DCN $110_2$ may at various times provide first DCN $110_1$ with a non-critical or non-time-sensitive first sensor reading from FT component $114_2$. At various other times, second DCN $110_2$ may provide first DCN $110_1$ with a second sensor reading from sensor $118_2$ that, unlike the first sensor reading, is critical and/or time-sensitive for a process control loop. In this scenario, second DCN $110_2$ may transmit the first sensor reading to first DCN $110_1$ over process automation network 106, e.g., regardless of whether there is network congestion. However, if network congestion is detected on process automation network 106, second DCN $110_2$ may divert the second sensor reading to first DCN $110_1$ via out-of-band communication channel 109 instead.

In some implementations, account may be taken—e.g., by diversion module 103 and/or by other process automation nodes—of functionality and/or availability of individual process automation nodes such as DCNs $110_{1-3}$ when selectively diverting traffic from to/from out-of-band communication channel 109. For example, multiple similar or identical DCNs 110 may be communicatively coupled to each other (e.g., daisy chained) via an out-of-band communication channel, but only one of the multiple DCNs may be communicatively coupled directly to process automation network 106. The other DCNs may serve as backups for redundancy purposes, such that if a sensor 118 or actuator 116 of the one DCN fails, or if a function block of the one DCN fails, one or more of the other DCNs may take over. Assuming the one DCN is still able to communicate over process automation network 106, this avoids the need to reassign its IP address to another DCN. In other words, from the perspectives of other nodes of process automation facility 108, there is no change to the network.

Figure 2:
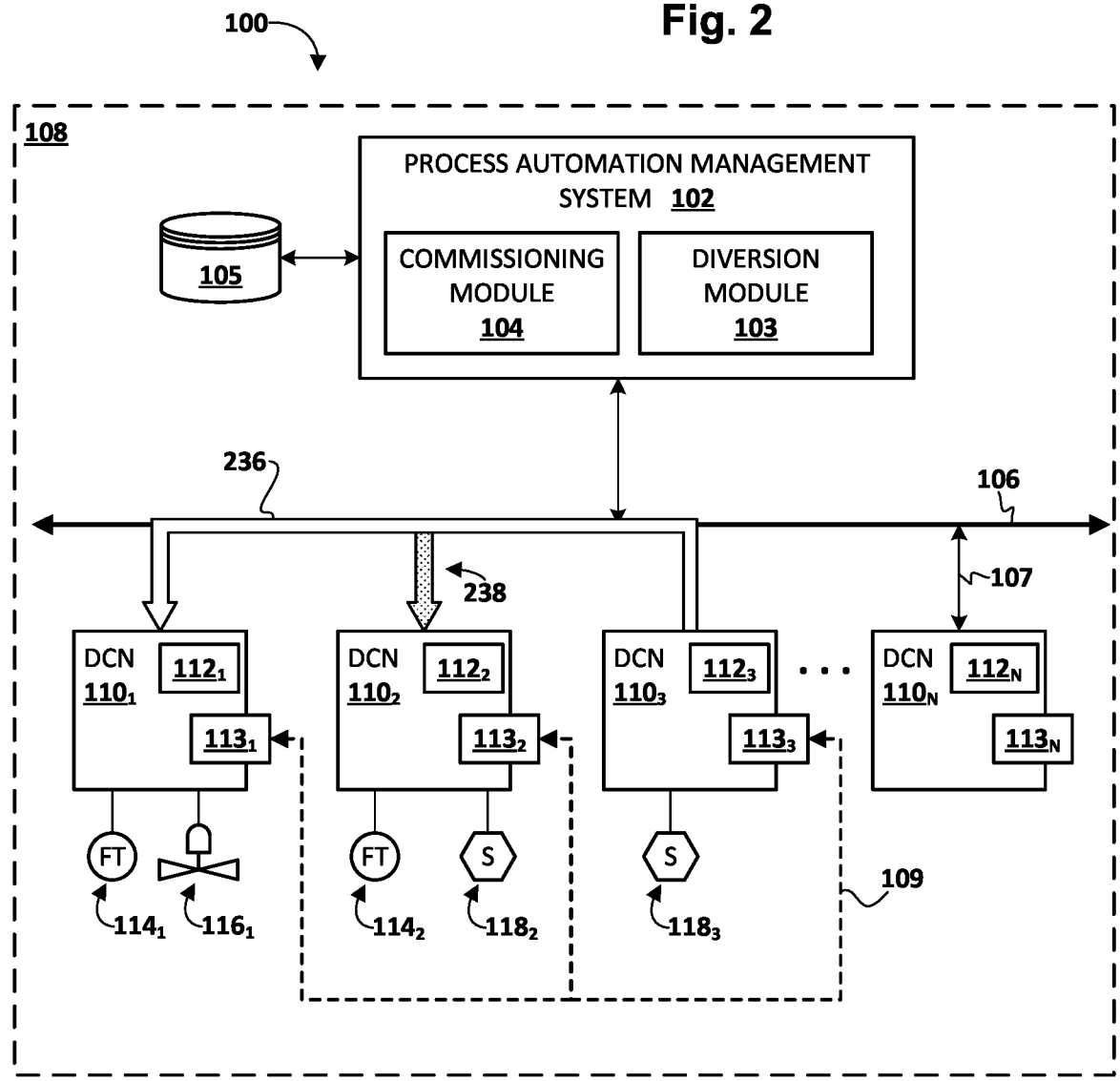

FIG. 2 depicts one example of normal operation of process automation facility 108. In this example, sensor $118_3$ of third DCN $110_3$ generates sensor data that is used by first DCN $110_1$, e.g., alone or in conjunction with other data such as a flow rate provided by FT component $114_1$, to control actuator $116_1$. Third DCN $110_3$ may relay this sensor data from sensor $118_3$ to first DCN $110_1$, as shown by the white arrow indicated at 236. In some implementations, as part of relaying this sensor data, third DCN $110_3$ may process the sensor data in various ways, such as formatting the sensor data into a format that is compatible with, and/or is accepted or understood by first DCN $110_1$.

As indicated by the shaded arrow 238, in some cases, this relayed sensor data may also be capable of interception from process automation network 106 by second DCN $110_2$ (and potentially other nodes of process automation facility 108). Some of the sensor data generated by sensor $118_3$ may be considered sensitive, private, and/or proprietary. Further, an entity that controls process automation facility 108 may have a higher level of trust with the manufacturer of third DCN $110_3$ than it does with the manufacturer of second DCN $110_2$. Under such circumstances, there may be some concern that second DCN $110_2$ retains some network connectivity (e.g., a backdoor) with one or more entities outside of process automation facility 108, and therefore, there may be some risk that second DCN $110_2$ could expose this intercepted sensor data to unauthorized parties. Out-of-band communication channel 109 may be used to circumvent DCN $110_2$, and thereby prevent such sensor data from being intercepted by second DCN $110_2$.

Individual components of process automation system 108, such as any of DCNs $110_{1-N}$, may be assigned measures of trust in various ways. In some implementations, a measure of trust of a device may correspond to a measure of trust associated with (e.g., assigned to) an entity forming part of a supply chain for the device, such as a manufacturer or distributor. Additionally or alternatively, a measure of trust may be assigned to a device such as a DCN 110 based on a state or configuration of the device itself. If the device's software (e.g., security software such as anti-virus, function blocks, etc.) is not up-to-date, that device may be deemed less trustworthy than other, up-to-date devices. The device's network settings and/or location on the network may also be considered when determining the device's measure of trust. Devices behind a firewall may be assigned greater measures of trust than other, unguarded devices.

For instance, in response to detecting packet(s) flagged with high measures of privacy, diversion module 103 may instruct third DCN $110_3$ to disable and/or disconnect the portion of out-of-band communication channel 109 between DCNs $110_2$ and $110_3$, while leaving second DCN $110_2$ connected to process automation network 106. This may allow diversion module 103 and/or third DCN $110_3$ to mitigate against the risk of interception by diverting the sensor data generated by sensor $118_3$ from process automation network 106 to out-of-band communication channel 109.

Figure 3:
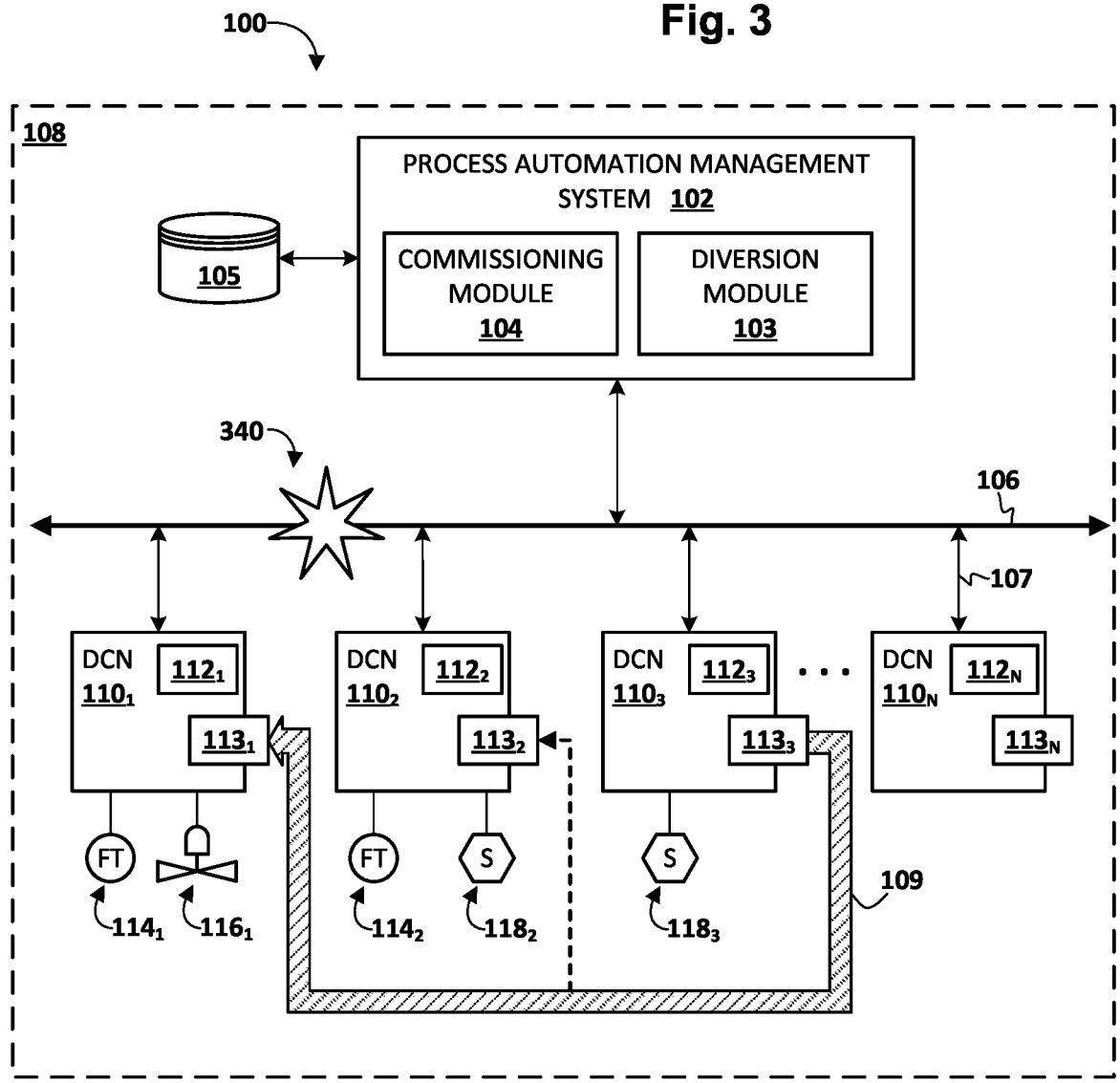

FIG. 3 depicts an example scenario in which a disruption 340 has occurred on process automation network 106. Other components and the general scenario in FIG. 3 are identical to those depicted in FIGS. 1-2. Disruption 340 may be network congestion that causes some packets to be dropped and/or prevents timely delivery of some packets. Alternatively, disruption 340 may be a break (e.g., a kink or severed portion) in process automation network 106 between first DCN $110_1$ and third DCN $110_3$. Whichever the case, disruption 340 may be detected, e.g., by either of DCNs $110_1/110_3$ and/or by diversion module 103, and may trigger diversion of traffic addressed by third DCN $110_3$ to first DCN $110_1$ via out-of-band communication channel 109, as shown by the shaded arrow at bottom.

In some implementations, not only is traffic addressed by third DCN $110_3$ to first DCN $110_1$ diverted in this manner, but any traffic that is unable to reach its destination (or at least unable to reach it in a timely manner) due to disruption 340 may be diverted through DCNs $110_1/110_3$, at least until disruption 340 is remedied. For example, diversion module 103 may detect disruption 340 and instruct all or some of DCNs $110_{2-N}$ that traffic addressed to first DCN $110_1$ should be rerouted to an IP address of third DCN $110_3$, so that third DCN $110_3$ can relay that information to first DCN $110_1$ over out-of-band communication channel 109. And while not shown in FIG. 3, second DCN $110_2$ is also coupled to out-of-band communication channel 109, and therefore may additionally or alternatively be used to divert traffic to/from first DCN $110_1$, assuming second DCN $110_2$ has a sufficient level of trust.

Figure 4:
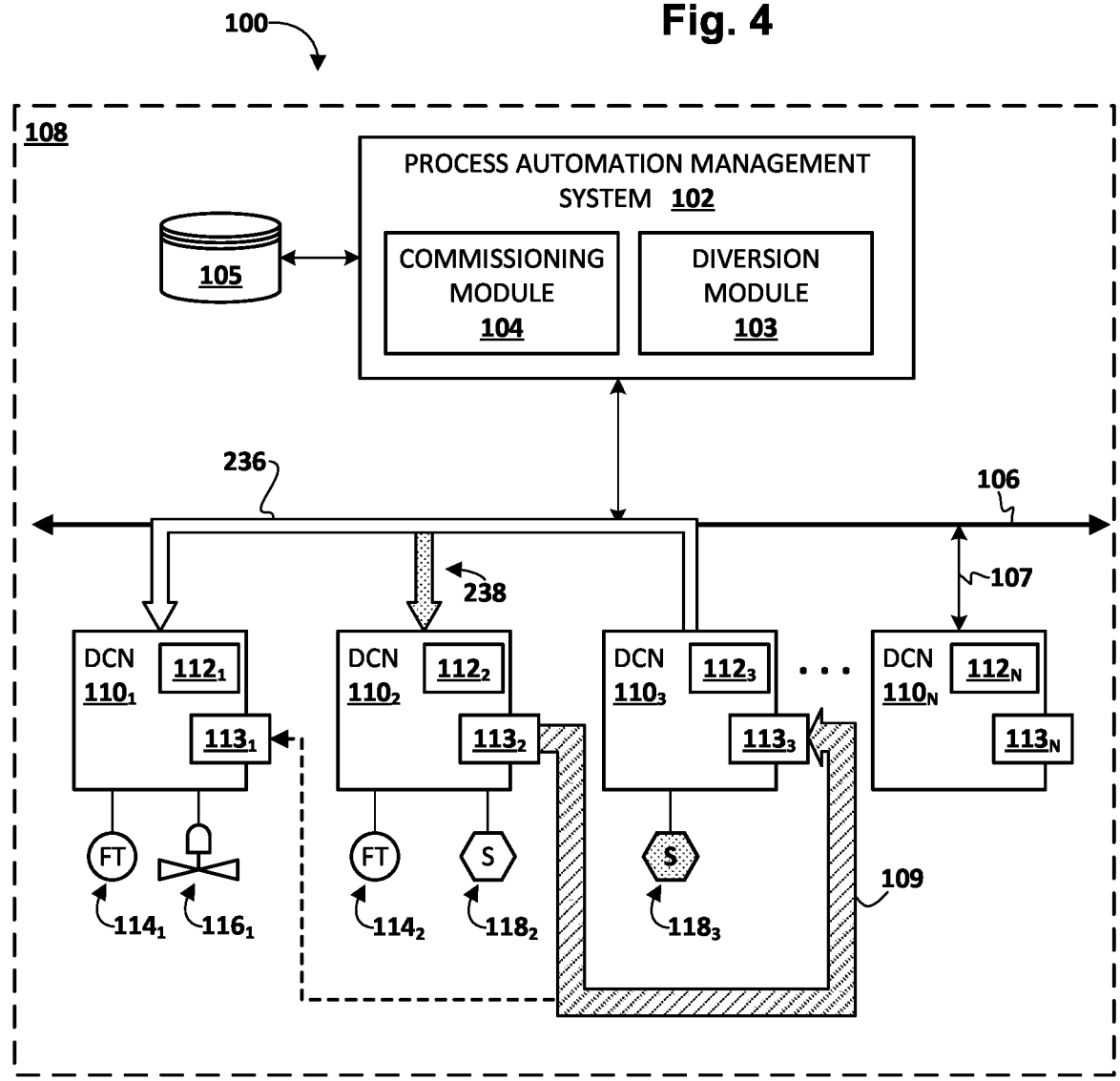

FIG. 4 depicts an example scenario in which sensor $118_3$ of third DCN $110_3$ has failed, as indicated by it being shaded. Third DCN $110_3$, however, is otherwise operational. As noted previously, first DCN $110_1$ operates actuator $116_1$ based at least in part on sensor data generated by sensor $118_3$. Consequently, first DCN $110_1$ may be unable to properly operate actuator $116_1$ without somehow mitigating the loss of sensor $118_3$.

However, a similar, or even identical, sensor may be available in connection with another DCN. For example, sensor $118_2$ of second DCN $110_2$ may be similar to, or even identical to, sensor $118_3$ of third DCN $110_3$. In such a scenario, and assuming sensor $118_2$ would not be overburdened, second DCN $110_2$ may divert "substitute" sensor data generated by sensor $118_2$ to third DCN $110_3$ via out-of-band communication channel 109, as shown by the shaded arrow at bottom of FIG. 4. Third DCN $110_3$ may then relay this substitute sensor data to first DCN $110_1$ over process automation network 106 as shown by arrow 236, similar to FIG. 2. This avoids having to reconfigure process automation network 106 parameters such as individual IP addresses, routing tables, domain name server (DNS) tables, etc.

In some cases, from the perspective of first DCN $110_1$, there may have been no change in the data it receives and it can continue to operate normally. However, second DCN $110_2$ may be configured to publish sensor data generated by sensor $118_2$ in a different format than that used by third DCN $110_3$ to publish sensor data generated by sensor $118_3$. In some such implementations, diversion module 103 may instruct second DCN $110_2$ to publish the substitute sensor data in a particular format, even going so far as provisioning OT configuration data to be installed on second DCN $110_2$ to enable such formatting, if necessary. Alternatively, diversion module 103 may instruct first DCN $110_1$ to accept substitute sensor data in the format published natively by second DCN $110_2$, or to convert that published substitute sensor data to its own format. As yet another alternative, another DCN, such as compute $DCN_N$, may serve as a gateway that can convert between these various sensor data formats. In such case, out-of-band communication channel 109 may be extended to $DCN_N$, e.g., from second DCN $110_2$ and/or first DCN $110_1$, to facilitate such a conversion.

When multiple candidate process automation nodes are capable of taking over a role performed by a disabled process automation node, various techniques may be employed to select which candidate process automation node takes over. In some implementations, available bandwidth of one or more out-of-band communication channels may be analyzed to select the best candidate replacement process automation node. For example, a particular process automation node may be connected to two different candidate replacement process automation nodes via two different out-of-band communication channels. Either of the two candidate replacement process automation nodes may be suitable to take over duties of another, malfunctioning node. If one of the out-of-band communication channels has more available bandwidth than the other, then the corresponding candidate replacement process automation node may be selected as the replacement.

Additionally or alternatively, in some implementations, process automation nodes may vote on the candidates, e.g., with each node voting based on its own self-interests (e.g., continuing to receiving sensor data in a timely manner). For example, when a process automation node needs replacement, each remaining process automation node may vote for candidate replacement process automation node(s) that are least likely to negatively impact the voting process automation node's own performance. Consequently, those candidate replacement nodes with the most votes may be the nodes that are most likely able to take over the functionality of the to-be-replaced node without degrading performance of the process automation system as a whole. Additionally or alternatively, voting process automation nodes may cast votes for candidate replacement process automation nodes that have exhibited, from their own perspectives and/or based on objective metrics, the best, timeliest, and/or most consistent performance; the idea being that those nodes getting the most votes can be depended on the most are best suited to take over duties of other nodes.

In some implementations, artificial intelligence and/or machine learning may be employed to select from multiple candidate process automation nodes. For example, for each process automation node, a feature vector or embedding may be generated that includes various features of the respective node. These feature vectors may then be analyzed for similarities to the disabled process automation node, e.g., using techniques such as cosine similarity or dot product, to determine which is best-suited to take over. As another example, different permutations of process automation facility 108 that would exist if different candidate process automation nodes take over the disabled node's functionality may be generated and represented as candidate state feature vectors. The candidate state feature vector that is most similar to, for instance, the configuration of process automation facility 108 prior to the node becoming disabled or to a known functional permutation of similar process automation facilities, may be selected.

Figure 5:
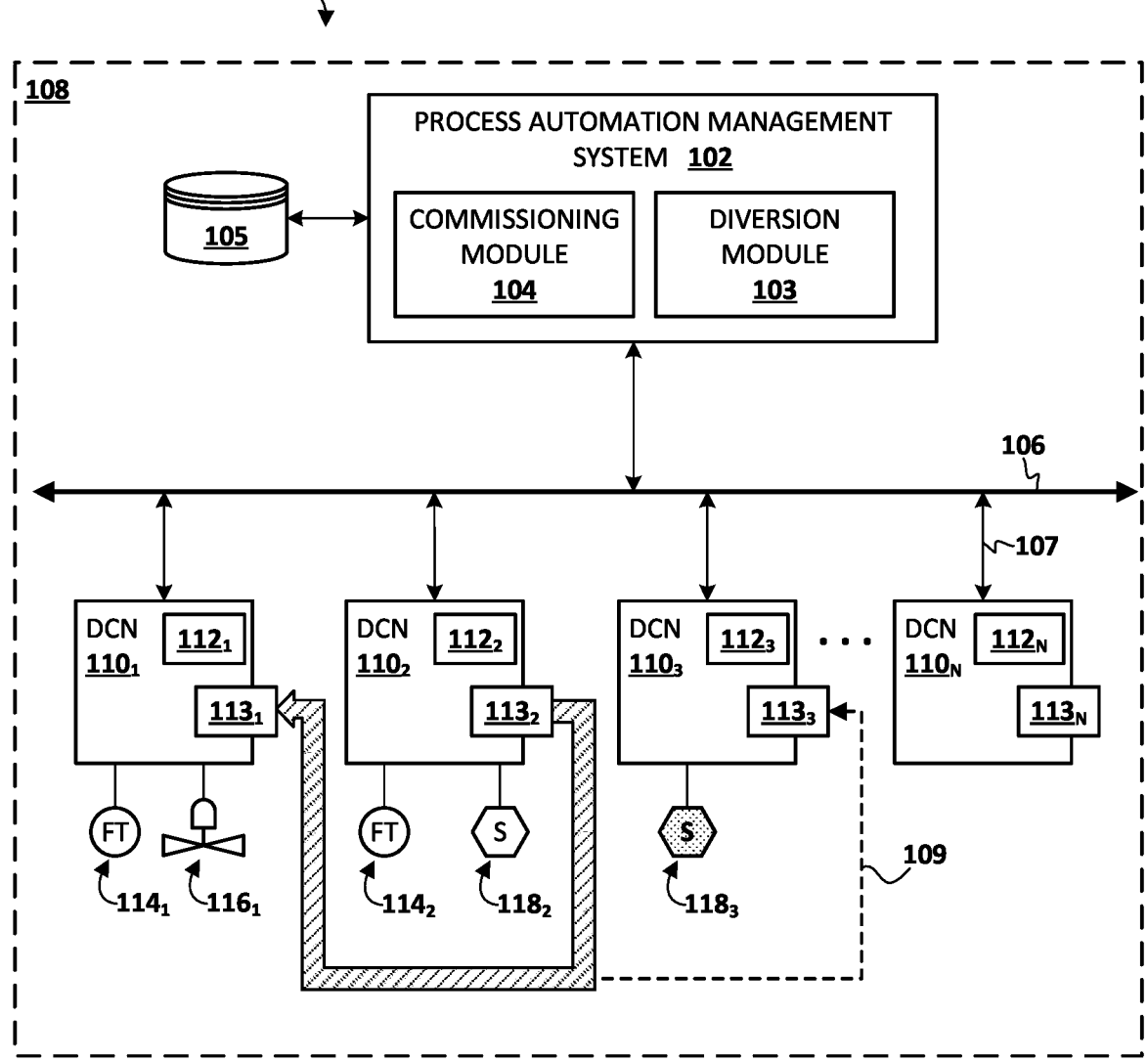

FIG. 5 depicts the same scenario as FIG. 4, where sensor 118$_3$ has failed. In this example, third DCN 110$_3$ itself may or may not have failed as well. In any case, rather than diverting substitute sensor data from second DCN 110$_2$ to third DCN 110$_3$ via out-of-band communication channel 109, and then from third DCN 110$_3$ back to first DCN 110$_1$ via process automation network 106, as was the case in FIG. 4, second DCN 110$_2$ may simply transmit the substitute sensor data directly to first DCN 110$_1$ over out-of-band communication channel 109, as shown by the shaded arrow at bottom. In some such implementations, diversion module 103 and/or second DCN 110$_2$ may first inform first DCN 110$_1$ that the substitute sensor data would be arriving over out-of-band communication channel 109, rather than via process automation network 106.

Figure 6:
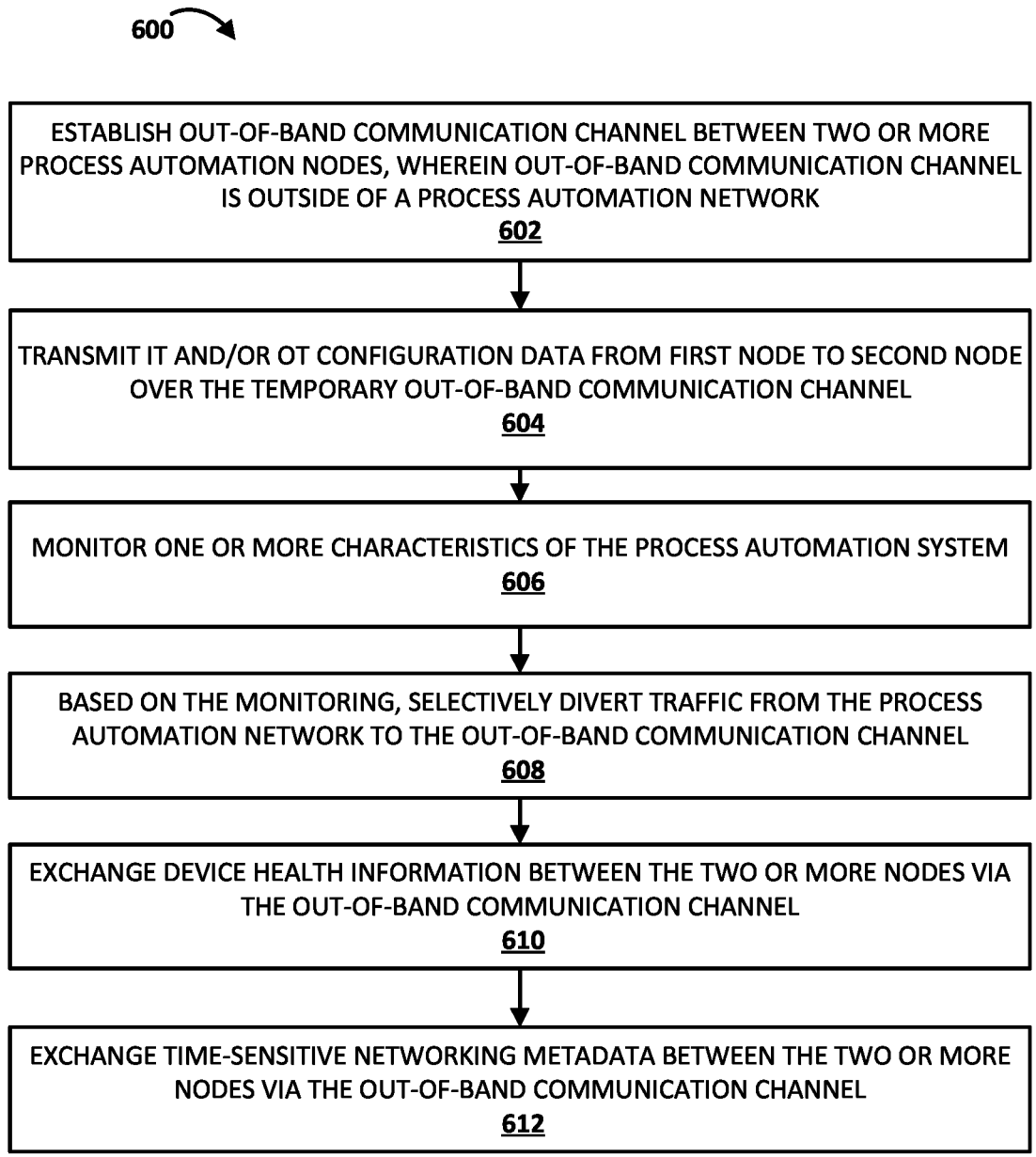
FIG. 6 illustrates an example method for performing selected aspects of the present disclosure.

FIG. 6 is a flowchart illustrating an example method 600 for practicing selected aspects of the present disclosure, in accordance with implementations disclosed herein. For convenience, the operations of the flow chart are described with reference to a system that performs the operations. This system may include various components of various computer systems, such as diversion module 103, and/or other devices such as any of DCNs 110$_{1-N}$. Moreover, while operations of method 600 are shown in a particular order, this is not meant to be limiting. One or more operations may be reordered, omitted or added.

At block 602, the system may establish an out-of-band communication channel (e.g., 109) between two or more process automation nodes (e.g., two or more of DCNs 110$_{1-N}$) of a process automation system (e.g., 108). As noted previously, the out-of-band communication channel may be outside of, and/or distinct or separate from, a process automation network (e.g., 106) through which the two or more process automation nodes are communicatively coupled with other process automation nodes of the process automation system. The two or more process automation nodes coupled via out-of-band communication channel 109 may cooperate with one or more of the other process automation nodes to implement an at least partially automated process.

In some implementations in which one or more of the two or more process automation nodes is being added to the process automation system (e.g., as a replacement, addition, upgrade, etc.), at block 604, a first of the two or more process automation nodes may transmit configuration data to a second of the two or more process automation nodes over the out-of-band communication channel. In various implementations, the configuration data may include information technology (IT) configuration data that is usable by the second process automation node to join the process automation network, and OT configuration data that is usable by the second process automation node to cooperate with the one or more of the other process automation nodes of the process automation system to implement the at least partially automated process. In various implementations, configuration IT and/or OT configuration data via out-of-band communication channel 109, rather than over process automation network 106, may at least partially and/or temporarily shield both the process automation node being added and other existing member nodes from malicious software such as viruses, Trojan horses, etc., at least until appropriate security measures can be put into place.

At block 606, the system, e.g., by way of diversion module 103 and/or individual DCNs 110, may monitor one or more characteristics of the process automation system. As noted previously, these characteristics may include, but are not limited to, network traffic, availability and/or effectiveness of function block(s) implemented by process automation node(s) of the process automation system, etc. With regard to network traffic, the characteristics may include, but are not limited to, a measure of network congestion and/or disruption (e.g., e.g., percentage of bandwidth used, percentage of dropped/delayed packets, etc.), measure(s) of privacy or sensitivity attributable to at least some of the network traffic, relatively priorities amongst packets of the network traffic, etc. Based on the monitoring, at block 608, the system, e.g., by way of diversion module 103 sending commands and/or individual nodes taking action, may selectively divert traffic from the process automation network to the out-of-band communication channel.

At optional block 610, the system, e.g., by way of individual DCNs 110, may exchange device health information between the two or more nodes via the out-of-band communication channel. For example, third DCN 110$_3$ may periodically provide first DCN 110$_1$ with health data such as a heartbeat, or a status of sensor 118$_3$ (on which first DCN 110$_1$ depends for operation of actuator 116$_1$). If first DCN 110$_1$ does not receive this health data, or the health data indicates sensor 118$_3$ has failed, then first DCN 110$_1$ may mitigate appropriately, e.g., by informing diversion module 103, requesting substitute sensor data from second DCN 110$_2$, etc. Exchanging device health information over out-of-band communication channel 109, rather than via process automation network 106, may avoid burdening process automation network 106 with this additional device health traffic, which may not be useful outside of the two or more nodes that exchange it.

At optional block 612, the system, e.g., by way of individual DCNs 110, may exchange time-sensitive networking metadata between the two or more nodes via the out-of-band communication channel. In many scenarios in which process automation is deployed, such as oil/chemical refining or processing, time may be of the essence. Accordingly, nodes may exchange time-sensitive networking metadata that enables them to synchronize their exchanges of data temporally, despite the underlying process automation network 106 being implemented using an asynchronous communication technology such as Ethernet. Exchanging time-sensitive networking metadata over out-of-band communication channel 109, rather than via process automation network 106, may avoid burdening process automation network 106 with this additional traffic, which may not be useful outside of the two or more nodes that exchange it.

Figure 7:
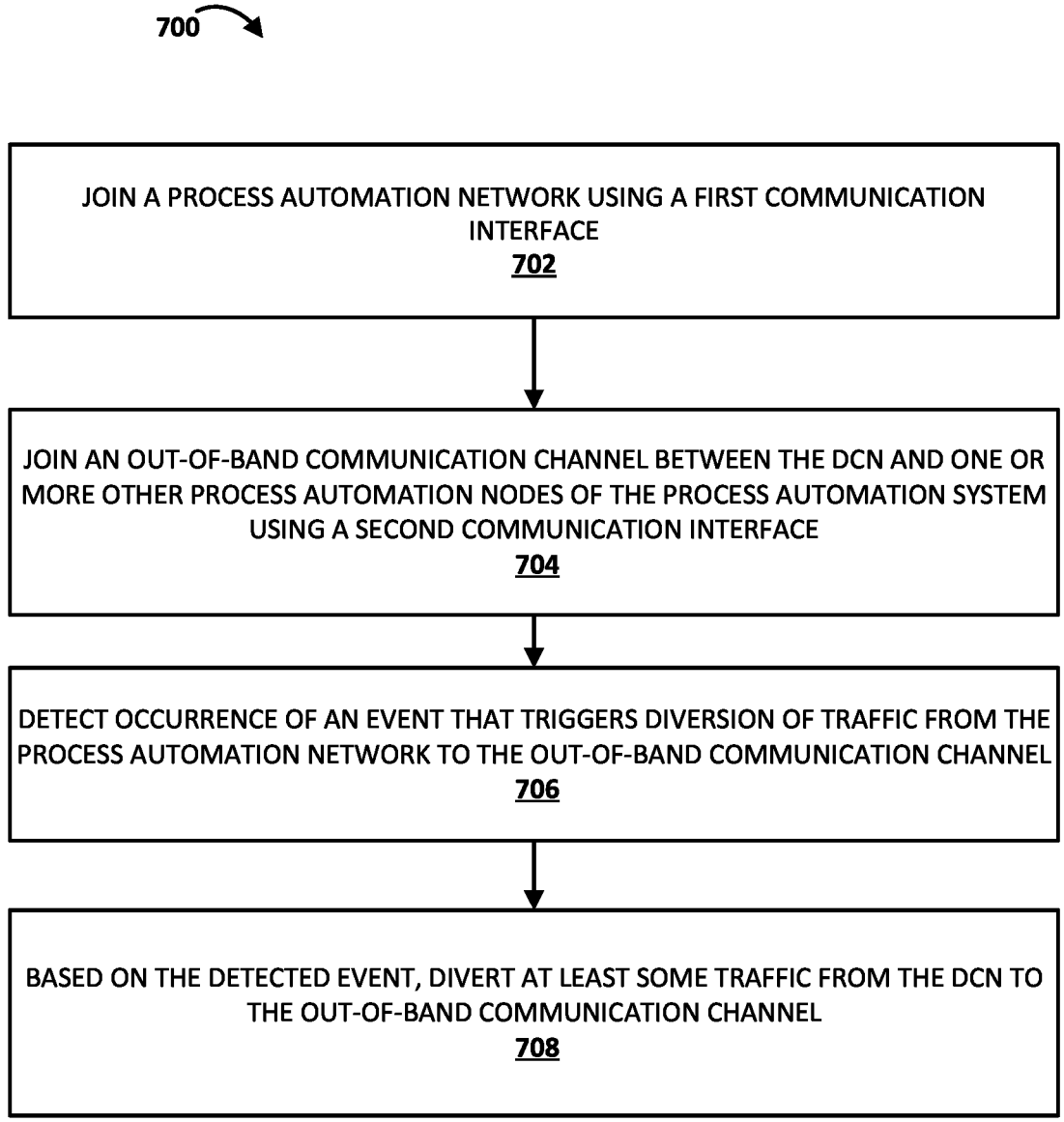
FIG. 7 illustrates another example method for performing selected aspects of the present disclosure.

FIG. 7 is a flowchart illustrating an example method 700 for a DCN (e.g., any of 110$_{1-N}$) to practice selected aspects of the present disclosure, in accordance with implementations disclosed herein. While operations of method 700 are shown in a particular order, this is not meant to be limiting. One or more operations may be reordered, omitted or added.

At block 702, the DCN (e.g., any of 110$_{1-N}$ in FIGS. 1-5) may join a process automation network using a first communication interface (e.g., 107). The process automation network may communicatively couples a plurality of process automation nodes of a process automation system. At block 704, the DCN may join an out-of-band communication channel (e.g., 109) between the DCN and one or more other process automation nodes of the process automation system using a second communication interface (e.g., 113).

At block 706, the DCN may detect occurrence of an event that triggers diversion of traffic from the process automation network to the out-of-band communication channel. For example, the DCN may monitor characteristics of the process automation system such as network traffic (e.g., network congestion and/or availability, sensitive and/or prioritized packets), ability of nodes to perform their respective roles, etc. An event may be detected where, for instance, network congestion reaches some threshold, a portion of the process automation network becomes unavailable, network traffic increases or decreases in sensitivity or priority, or one or more process automation nodes are no longer able to perform their roles. Based on the detected event, at block 708, the DCN may divert at least some traffic from the DCN to the out-of-band communication channel.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods of FIGS. 6-7, as well as to implement various components depicted in FIGS. 1-5.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

establishing an out-of-band communication channel between two or more process automation nodes of a process automation system, wherein the out-of-band communication channel is outside of a process automation network through which the two or more process automation nodes are communicatively coupled with other process automation nodes of the process automation system, and wherein the two or more process automation nodes cooperate with one or more of the other process automation nodes to implement a process loop in which one or more actuators are operated automatically based on output of one or more sensors;

transmitting configuration data from a first process automation node of the two or more process automation nodes to a second process automation node of the two or more process automation nodes over the out-of-band communication channel, wherein the configuration data includes:
   information technology (IT) configuration data that is usable by the second process automation node to join the process automation network,
   operational technology (OT) configuration data that is usable by the second process automation node to cooperate with the one or more of the other process automation nodes of the process automation system to implement the process loop;
monitoring one or more characteristics of the process automation system; and
based on the monitoring, selectively diverting traffic from the process automation network to the out-of-band communication channel.

2. The method of claim 1, wherein the one or more monitored characteristics of the process automation system include network traffic on the process automation network.

3. The method of claim 2, wherein the one or more monitored characteristics of the process automation system include network congestion detected based on the network traffic on the process automation network.

4. The method of claim 2, wherein the one or more monitored characteristics of the process automation system include a measure of privacy assigned to at least some of the network traffic, and the selectively diverting includes diverting network traffic assigned a first measure of privacy from the process automation network to the out-of-band communication channel.

5. The method of claim 2, wherein the one or more monitored characteristics of the process automation system include relative priorities assigned to at least some of the network traffic, and the selectively diverting includes diverting network traffic assigned a first relative priority from the process automation network to the out-of-band communication channel.

6. The method of claim 1, wherein the one or more monitored characteristics of the process automation system include an ability of a given process automation node of the process automation system to execute a function block.

7. The method of claim 1, wherein the monitoring is performed by a distributed control node (DCN) before the DCN publishes data to other process automation nodes of the process automation network.

8. The method of claim 1, wherein the two or more process automation nodes comprise at least three process automation nodes, and the out-of-band communication channel comprises a network that communicatively couples the at last three process automation nodes and that is implemented using a different communication technology than the process automation network.

9. The method of claim 1, further comprising exchanging device health information between the two or more nodes via the out-of-band communication channel.

10. The method of claim 1, further comprising exchanging time-sensitive networking metadata between the two or more nodes via the out-of-band communication channel.

11. A system comprising one or more processors and memory storing instructions that, in response to execution of the instructions, cause the one or more processors to:
   establish an out-of-band communication channel between two or more process automation nodes of a process automation system, wherein the out-of-band communication channel is outside of a process automation network through which the two or more process automation nodes are communicatively coupled with other process automation nodes of the process automation system, and wherein the two or more process automation nodes cooperate with one or more of the other process automation nodes to implement a process loop in which one or more actuators are operated automatically based on output of one or more sensors;
   transmit configuration data from a first process automation node of the two or more process automation nodes to a second process automation node of the two or more process automation nodes over the out-of-band communication channel, wherein the configuration data includes:
      information technology (IT) configuration data that is usable by the second process automation node to join the process automation network,
      operational technology (OT) configuration data that is usable by the second process automation node to cooperate with the one or more of the other process automation nodes of the process automation system to implement the process loop;
   monitor one or more characteristics of the process automation system; and
   based on one or more of the monitored characteristics of the process automation system, selectively divert traffic from the process automation network to the out-of-band communication channel.

12. The system of claim 11, wherein the one or more monitored characteristics of the process automation system include network traffic on the process automation network.

13. The system of claim 12, wherein the one or more monitored characteristics of the process automation system include network congestion detected based on the network traffic on the process automation network.

14. The system of claim 12, wherein the one or more monitored characteristics of the process automation system include a measure of privacy assigned to at least some of the network traffic, and the instructions to selectively divert include instructions to divert network traffic assigned a first measure of privacy from the process automation network to the out-of-band communication channel.

15. The system of claim 12, wherein the one or more monitored characteristics of the process automation system include relative priorities assigned to at least some of the network traffic, and the instructions to selectively divert include instructions to divert network traffic assigned a first relative priority from the process automation network to the out-of-band communication channel.

16. The system of claim 11, wherein the one or more monitored characteristics of the process automation system include an ability of a given process automation node of the process automation system to execute a function block.

17. The system of claim 11, wherein the instructions to monitor are performed by a distributed control node (DCN) before the DCN publishes data to other process automation nodes of the process automation network.

18. The system of claim 11, wherein the two or more process automation nodes comprise at least three process automation nodes, and the out-of-band communication channel comprises a network that communicatively couples the at last three process automation nodes and that is implemented using a different communication technology than the process automation network.

19. The system of claim 11, further comprising instructions to exchange device health information or time-sensitive networking metadata between the two or more nodes via the out-of-band communication channel.

20. A non-transitory computer-readable medium comprising instructions that, in response to execution of the instructions by a processor, cause the processor to:
  establish an out-of-band communication channel between two or more process automation nodes of a process automation system, wherein the out-of-band communication channel is outside of a process automation network through which the two or more process automation nodes are communicatively coupled with other process automation nodes of the process automation system, and wherein the two or more process automation nodes cooperate with one or more of the other process automation nodes to implement a process loop in which one or more actuators are operated automatically based on output of one or more sensors;
  transmit configuration data from a first process automation node of the two or more process automation nodes to a second process automation node of the two or more process automation nodes over the out-of-band communication channel, wherein the configuration data includes:
    information technology (IT) configuration data that is usable by the second process automation node to join the process automation network,
    operational technology (OT) configuration data that is usable by the second process automation node to cooperate with the one or more of the other process automation nodes of the process automation system to implement the process loop;
  monitor one or more characteristics of the process automation system; and
  based on one or more of the monitored characteristics of the process automation system, selectively divert traffic from the process automation network to the out-of-band communication channel.

* * * * *